(12) United States Patent
Ramezani et al.

(10) Patent No.: US 11,232,358 B1
(45) Date of Patent: Jan. 25, 2022

(54) TASK SPECIFIC PROCESSING OF REGULATORY CONTENT

(71) Applicant: MOORE & GASPERECZ GLOBAL INC., Vancouver (CA)

(72) Inventors: Mahdi Ramezani, Vancouver (CA); Kenneth Smith, Surrey (CA); Elijah Solomon Krag, Vancouver (CA); Amir Abbas Tahmasbi, Vancouver (CA); Margery Moore, Salt Spring Island (CA)

(73) Assignee: MOORE & GASPERECZ GLOBAL INC., Vancouver (CA)

( * ) Notice: Subject to any disclaimer, the term of this patent is extended or adjusted under 35 U.S.C. 154(b) by 0 days.

(21) Appl. No.: 17/486,555

(22) Filed: Sep. 27, 2021

Related U.S. Application Data (63) Continuation of application No. 17/093,416, filed on Nov. 9, 2020.

(51) Int. Cl.
*G06F 40/279* (2020.01)
*G06F 40/30* (2020.01)
(Continued)

(52) U.S. Cl.
CPC ............ *G06N 3/08* (2013.01); *G06F 40/279* (2020.01); *G06F 40/30* (2020.01); *G06Q 10/10* (2013.01); *G06Q 50/26* (2013.01)

(58) Field of Classification Search
CPC .......... G06F 40/278; G06F 40/30; G06N 3/08
See application file for complete search history.

(56) References Cited

U.S. PATENT DOCUMENTS 7,823,120 B2 * 10/2010 Kazakov ................... G06F 8/10
717/104
8,156,010 B2 4/2012 Gopalakrishnan
(Continued)

FOREIGN PATENT DOCUMENTS

CA 2256408 C 12/1997
CA 2381460 A1 2/2001
(Continued)

OTHER PUBLICATIONS

Elwany, E. et al.; "BERT Goes to Law School: Quantifying the Competitive Advantage of Access to Large Legal Corpora in Contract Understanding", arXiv: Computation and Language, 2019, pp. 1-4.
(Continued)

*Primary Examiner* — Daniel C Washburn
*Assistant Examiner* — Oluwadamilola M Ogunbiyi (57) ABSTRACT

A neural network system for performing a processing task on regulatory content and a method for training the system are disclosed. The method for training involves configuring a neural network language model capable of generating a language embedding output in response to receiving content. The method further involves fine-tuning the language model using regulatory content training data to generate a regulatory content language embedding output for regulatory content processed by the language model. The method also involves configuring at least one task specific output layer to generate task specific results in response to receiving the regulatory content language embedding output from the language model, and training the neural network system using task specific training data to output the task specific results, at least a portion of the task specific training data having been labeled prior to configuring the task specific neural network.

21 Claims, 4 Drawing Sheets

(51) Int. Cl.
*G06N 3/08* (2006.01)
*G06Q 10/10* (2012.01)
*G06Q 50/26* (2012.01)

(56) References Cited

U.S. PATENT DOCUMENTS

| | | | |
|---|---|---|---|
| 8,306,819 B2* | 11/2012 | Liu | G10L 15/065 |
| | | | 704/244 |
| 8,897,563 B1 | 11/2014 | Welling et al. | |
| 10,013,655 B1 | 7/2018 | Clark | |
| 10,516,902 B1* | 12/2019 | Manoria | H04N 21/266 |
| 10,565,502 B2 | 2/2020 | Scholtes | |
| 10,853,696 B1* | 12/2020 | Luo | G06K 9/6267 |
| 11,080,486 B2* | 8/2021 | Hao | G06F 40/216 |
| 2010/0228548 A1* | 9/2010 | Liu | G10L 15/065 |
| | | | 704/251 |
| 2018/0137107 A1* | 5/2018 | Buccapatnam Tirumala | |
| | | | G06K 9/629 |
| 2018/0197111 A1* | 7/2018 | Crabtree | G06K 9/00979 |
| 2019/0251397 A1* | 8/2019 | Tremblay | G06T 15/04 |
| 2019/0377785 A1* | 12/2019 | N | G06F 40/253 |
| 2020/0019767 A1 | 1/2020 | Porter et al. | |
| 2020/0074515 A1* | 3/2020 | Ghatage | G06F 16/35 |
| 2020/0082204 A1* | 3/2020 | Beaver | G06K 9/626 |
| 2020/0111023 A1* | 4/2020 | Pondicherry Murugappan | |
| | | | G06N 7/005 |
| 2020/0233862 A1 | 7/2020 | Shaked et al. | |
| 2020/0311201 A1* | 10/2020 | Sainani | G06F 40/279 |
| 2020/0320349 A1* | 10/2020 | Yu | G06K 9/6257 |
| 2020/0349920 A1* | 11/2020 | Al Bawab | G10L 15/14 |
| 2021/0089767 A1* | 3/2021 | Ashek | G06T 7/13 |
| 2021/0117621 A1* | 4/2021 | Sharpe | G06F 16/35 |
| 2021/0124800 A1* | 4/2021 | Williams | G06F 40/205 |
| 2021/0209358 A1* | 7/2021 | Alikhani | G06K 9/6267 |

FOREIGN PATENT DOCUMENTS

| | | |
|---|---|---|
| CA | 2410881 A1 | 12/2001 |
| CA | 2419377 A1 | 2/2002 |
| CA | 2699397 A1 | 4/2009 |
| CA | 2699644 A1 | 4/2009 |
| CN | 110705223 A | 1/2020 |
| EP | 2993617 A1 | 3/2016 |
| RU | 2628431 C1 | 8/2017 |

OTHER PUBLICATIONS

Lee, J. et al.; "BioBERT: a pre-trained biomedical language representation model for biomedical text mining", Bioinformatics, pp. 2019, 2019.

Nguyen, T. et al.; "Recurrent neural network-based models for recognizing requisite and effectuation parts in legal texts", Springer Science+Business Media B.V., 2018, pp. 169-199.

Chalkidis, I. et al.; "Deep learning in law: early adaptation and legal word embeddings trained on large corpora", Springer Nature B.V. 2018, pp. 171-198.

Tang, G. et al.; "Matching law cases and reference law provision with a neural attention model", 2016, pp. 1-4.

Kingston, J.; "Using artificial intelligence to support compliance with the general data protection regulation", Springer Science+Business Media B.V., 2017 pp. 429-443.

Fatema et al.; "A Semi-Automated Methodology for Extracting Access Control Rules from the European Data Protection Directive", IEE Computer Society, 2016, pp. 25-32.

Mandal, S. et al.; "Modular Norm Models: A Lightweight Approach for Modeling and Reasoning about Legal Compliance", IEE Computer Society, 2017, pp. 657-662.

Hashmi M.; "A Methodology for Extracting Legal Norms from Regulatory Documents", IEEE Computer Society, 2015, pp. 41-50.

Kiyavitskaya, N. et al.; "Automating the Extraction of Rights and Obligations for Regulatory Compliance", Conceptual Modeling, 2008, pp. 154-168.

Islam, M. et al. "RuleRS: a rule-based architecture for decision support systems", Spring Science+Business Media B. V., 2018, pp. 315-344.

Young T. et al., "Recent Trends in Deep Learning Based Natural Language Processing [Review Article]," IEEE Computational Intelligence Magazine, vol. 13, No. 3, pp. 1-32, 2018.

Radford A. et al., "Improving Language Understanding by Generative Pre-Training", pp. 1-12, 2018.

Devlin, J. et al. "BERT: Pre-training of Deep Bidirectional Transformers for Language Understanding", arXiv: Computation and Language, pp. 1-17, 2018.

Lan, Z. et al., "ALBERT: A Lite BERT for Self-Supervised Learning of Language Representations", arXiv: Computation and Language, pp. 1-17, 2019.

Liu, Y. et al., "RoBERTa: A Robustly Optimized BERT Pretraining Approach", arXiv: Computation and Language, pp. 2-13, 2019.

Denk T.I. et al., "BERTgrid: Contextualized Embedding for 2D Document Representation and Understanding.," arXiv: Computation and Language, pp. 1-4, 2019.

Locke, Daniel et al., Automatic cited decision retrieval: Working notes of lelab for FIRE Legal Track Precedence Retrieval Task, Queensland University of Technology, 2017, pp. 1-2.

Locke, Daniel et al., Towards Automatically Classifying Case Law Citation Treatment Using Neural Networks. The University of Queensland, Dec. 2019, pp. 1-8.

Sadeghian, Ali et al., "Automatic Semantic Edge Labeling Over Legal Citation Graphs", Springer Science+Business Media B.V., Mar. 1, 2018, pp. 128-144.

Sanh, V. et al., "DistilBERT, a Distilled Version of BERT: smaller, faster, cheaper and lighter", arXiv: Computation and Language, pp. 1-5, 2019.

Peters, M. E. et al., "To Tune or Not to Tune? Adapting Pretrained Representations to Diverse Tasks", arXiv: Computation and Language, pp. 1-8, 2019.

Siblini, C. et al., "Multilingual Question Answering from Formatted Text applied to Conversational Agents", arXiv: Computation and Language, pp. 1-10, 2019.

Lai, A. et al., "Natural Language Inference from Multiple Premises", arXiv: Computation and Language, pp. 1-10, 2017.

Katti A. et al., "Chargrid: Towards Understanding 2D Documents," arXiv: Computation and Language, 2018, pp. 1-11.

Soviany P. et al., "Optimizing the Trade-off between Single-Stage and Two-Stage Object Detectors using Image Difficulty Prediction," arXiv: Computer Vision and Pattern Recognition, pp. 2-6, 2018.

Tsai H. et al., "Small and Practical BERT Models for Sequence Labeling," pp. 9-11, 2019.

Yang X. et al., "Learning to Extract Semantic Structure from Documents Using Multimodal Fully Convolutional Neural Networks," The Pennsylvania State University, pp. 1-16, 2017.

\* cited by examiner

TASK SPECIFIC PROCESSING OF REGULATORY CONTENT

BACKGROUND

1. Field

This disclosure relates generally to performing computer implemented language processing tasks on regulatory content.

2. Description of Related Art

Governments at all levels generate documents setting out requirements and/or conditions that should be followed for compliance with the applicable rules and regulations. For example, Governments implement regulations, permits, plans, court ordered decrees, and bylaws to regulate commercial, industrial, and other activities considered to be in the public's interest. Standards bodies, companies, and other organizations may also generate documents setting out conditions for product and process compliance. These documents may be broadly referred to as "regulatory content".

Modern enterprises thus operate under an increasing burden of regulation, which has proliferated exponentially in an attempt by regulatory agencies and other governmental bodies to mitigate potential and actual dangers to the public. Documents setting out regulatory content may vary in size, from one page to several hundred pages. As a result, compliance with regulatory content has become increasingly difficult for enterprises. There remains a need for methods and systems that reduce the burden for enterprises in establishing which regulations and conditions in a body of regulatory content are applicable to their operations.

SUMMARY

In accordance with one disclosed aspect there is provided a method for training a computer implemented neural network system for performing a processing task on regulatory content. The method involves configuring a neural network language model capable of generating a language embedding output in response to receiving content. The method further involves fine-tuning the language model using regulatory content training data to generate a regulatory content language embedding output for regulatory content processed by the language model. The method also involves configuring at least one task specific output layer to generate task specific results in response to receiving the regulatory content language embedding output from the language model, and training the neural network system using task specific training data to output the task specific results, at least a portion of the task specific training data having been labeled prior to configuring the task specific neural network.

Configuring the language model may involve configuring a pre-trained neural network language model for generation of the language embedding output, the pre-trained neural network language model including a plurality of layers of neurons, each neuron having an associated weight and bias, the weights and biases having been determined during training of the language model.

Fine-tuning the language model may involve one of modifying weights and biases of the neurons of the language model based on the regulatory content training data, freezing weights and biases of at least some of the layers of neurons while modifying weights and biases of other layers of neurons based on the regulatory content training data, or adding at least one additional layer of neurons to the language model and determining weights and biases of the least one at additional layer based on the regulatory content training data.

The regulatory content training data may include a plurality of documents including regulatory text.

The regulatory text in the plurality of documents may include unlabeled regulatory text.

The plurality of documents may include regulatory text in a plurality of different languages.

The plurality of documents including regulatory text may be pre-processed to generate the regulatory content training data by masking at least some words within sentences of the regulatory text and fine-tuning may involve configuring the neural network language model to generate a prediction for the masked words based on context provided by un-masked words in the sentence and updating the neural network language model based on a comparison between the generated prediction and the masked word.

The regulatory content training data may involve pairs of sentences extracted from regulatory text associated with the plurality of documents and fine-tuning may involve configuring the neural network language model to generate a prediction as to whether the second sentence in the sentence pair follows the first sentence in the document and updating the neural network language model based on whether the generated prediction is correct.

The regulatory content language embedding output may include a plurality of vectors, each vector including a plurality of values representing a context for each word in the regulatory content.

Configuring the at least one task specific output layer may involve configuring a classification layer operable to generate a classification output for the regulatory content.

Training the neural network system to generate the classification output may involve a further fine-tuning of the language model based on the task specific training data.

The classification output may be associated with one of an identification of a plurality of text fields within the regulatory content that have a common connotation between different documents, an identification of requirements or conditions within the regulatory content, or an identification of citations within the regulatory content, each citation being associated with one or more requirements or conditions within the regulatory content.

Configuring the at least one task specific output layer may involve configuring a classification output layer to generate a classification identifying text as a citation sequence, a classification identifying text as a citation title, and a classification identifying text as not being associated with a citation, and the neural network system may be trained using training data including samples labeled as corresponding to a citation sequence, samples labeled as corresponding to a citation title, and samples not associated with a citation.

Configuring the at least one task specific output layer may involve configuring a sibling classifier output layer to generate a classification identifying citations as being one of a sibling citation or not a sibling citation, the neural network system being trained using training data including pairs of samples including samples labeled as having a sibling relationship and samples labeled as not having a sibling relationship.

Configuring the at least one task specific output layer may involve configuring a sibling classifier output layer to generate a classification identifying citations as being one of a parent citation or not a parent citation, the neural network system being trained using training data including pairs of samples including samples labeled as having a parent relationship and samples labeled as not having a parent relationship.

Configuring the at least one task specific output layer may involve configuring a requirement classification output layer to generate a classification identifying text as corresponding to a requirement, a classification identifying text as corresponding to an optional or site-specific requirement, and a classification identifying text as including descriptive language related to a requirement but is not itself a requirement, and the neural network system may be trained using training data including text sequences that are labeled as requirements, labeled as optional or site-specific requirements, and labeled as descriptive text.

Configuring the at least one task specific output layer may involve configuring a requirement conjunction classifier output layer to generate a classification identifying a requirement as not being a conjunction, a classification identifying a requirement as being a conjunction between a parent requirement and a single child requirement, and a classification identifying a requirement as being a conjunction between a parent requirement and multiple child requirements, and, the neural network system is trained using training data including a plurality of pairs of separated requirements, each pair having an assigned label indicating whether the pair is not a conjunction, a single child requirement conjunction, or a multiple child requirement conjunction.

Configuring the at least one task specific output layer may involve configuring a smart field classifier output layer to generate a plurality of classifications identifying text fields within the regulatory content having a common connotation and the neural network system may be trained using training data including labeled samples corresponding to each of the plurality of classifications.

The task specific training data for training the task specific neural network may include a portion of unlabeled training data.

The portion of labeled task specific training data may involve regulatory text associated with a first language and the portion of unlabeled training data may include regulatory text associated with a language other than the first language.

In accordance with another disclosed aspect there is provided a system for performing a processing task on regulatory content. The system includes a processor circuit and codes for directing the processor circuit to implement a regulatory content language model capable of generating a language embedding output in response to receiving regulatory content, the regulatory content language model having been fine-tuned using regulatory content training data to generate a regulatory content language embedding output for regulatory content. The system also includes codes for directing the processor circuit to implement at least one task specific output layer to generate task specific results in response to receiving the regulatory content language embedding output from the language model, the neural network system having been trained using task specific training data to output the task specific results, at least a portion of the task specific training data having been labeled prior to configuring the task specific neural network.

Other aspects and features will become apparent to those ordinarily skilled in the art upon review of the following description of specific disclosed embodiments in conjunction with the accompanying figures.

BRIEF DESCRIPTION OF THE DRAWINGS

In drawings which illustrate disclosed embodiments.

DETAILED DESCRIPTION

Figure 1:
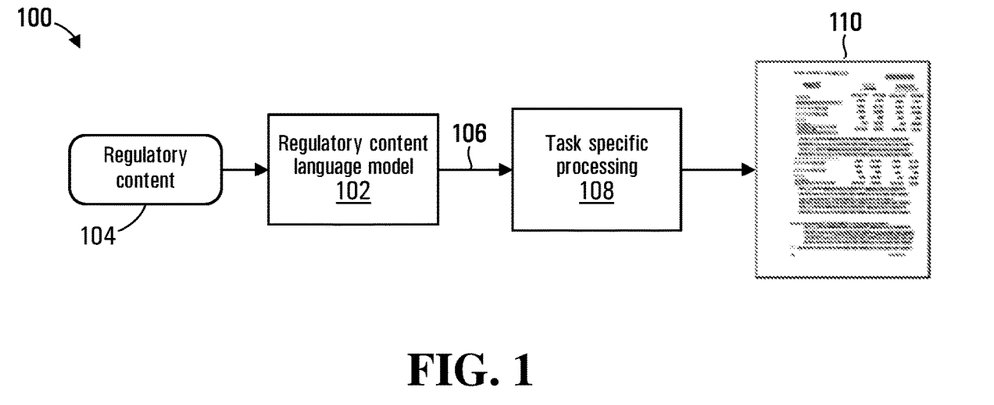
FIG. 1 is a block diagram of a computer implemented system for performing a processing task on regulatory content according to a first disclosed embodiment.

Referring to FIG. 1, a system for performing a processing task on regulatory content according to a first disclosed embodiment is shown generally at 100. The system 100 includes a regulatory content language model 102 that receives an input of regulatory content data 104 and generates a language embedding output 106 representing the semantic and syntactic meaning of words in the regulatory content. The regulatory content 104 may be received in any of a variety of text data formats, where words and characters in the text are encoded into a digital data format representing the text of the regulatory content. In other embodiments regulatory content may be received as image data, where the text is represented by pixels rather than digital text. In this case the regulatory content image data would be pre-processed to extract the text in a digital data format to generate the regulatory content 104.

The language embedding output 106 of the regulatory content language model 102 may be in the form of a set of values that define the semantic and syntactic meaning of each words in the regulatory content. In some language model implementations, the meaning of each word may be expressed as a vector having a plurality of values (typically several hundred values). The language embedding output 106 is fed through a task specific processing block 108 to perform additional processing that is specific to a particular task. The task specific processing block 108 and/or the regulatory content language model 102 may be further trained using task specific training data to output task specific results 110 for the regulatory content 104. Examples of some task specific results 110 include identification of citations within regulatory content, determination of relationships between citations, extraction of requirements from regulatory content, generation of associated requirement descriptions, and smart field recognition. These examples of task specific processing are described in more detail below.

Figure 2:
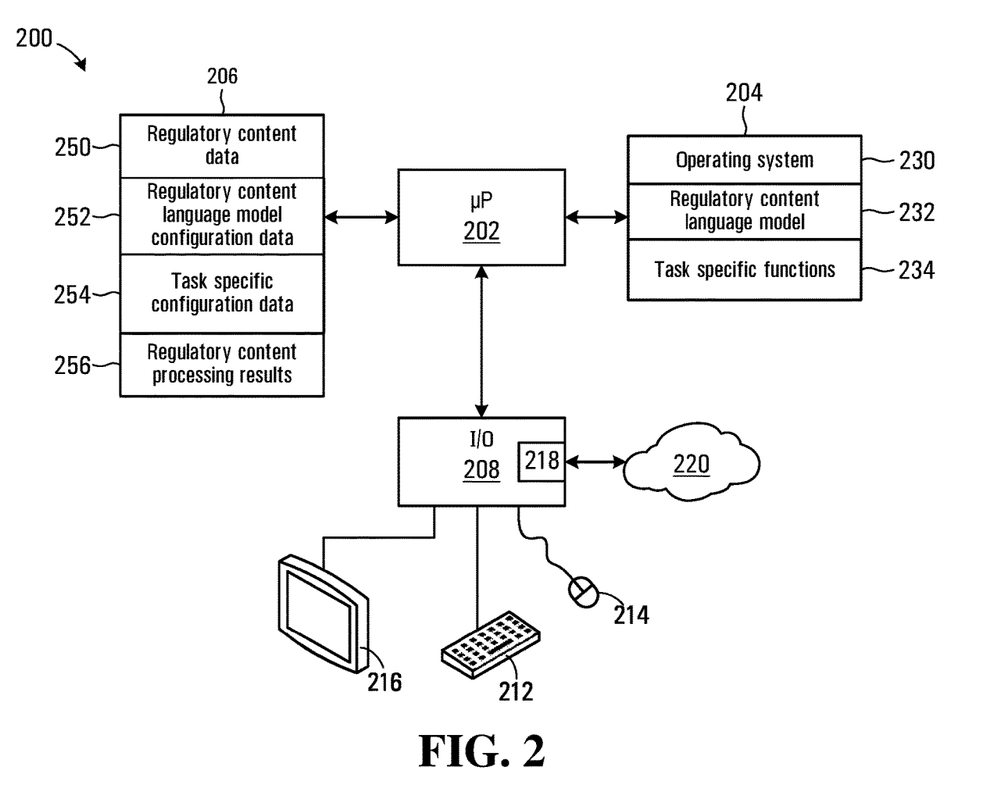
FIG. 2 is a block diagram of an inference processor circuit for implementing the system shown in FIG. 1.

The system 100 shown in FIG. 1 may be implemented on a processor circuit operably configured to provide inference functions for performing the processing task on the regulatory content 104. The regulatory content language model 102 and/or task specific processing block 108 may be implemented using various neural networks for processing the regulatory content 104. Referring to FIG. 2, an inference processor circuit is shown generally at 200. The inference processor circuit 200 includes a microprocessor 202, a program memory 204, a data storage memory 206, and an input output port (I/O) 208, all of which are in communication with the microprocessor 202. Program codes for directing the microprocessor 202 to carry out various functions are stored in the program memory 204, which may be implemented as a random access memory (RAM), flash memory, a hard disk drive (HDD), or a combination thereof.

The program memory 204 includes storage for program codes that are executable by the microprocessor 202 to provide functionality for implementing the various elements of the system 100. In this embodiment, the program memory 204 includes storage for program codes 230 for directing the microprocessor 202 to perform operating system functions. The operating system may be any of a number of available operating systems including, but not limited to, Linux, macOS, Windows, Android, and JavaScript. The program memory 204 also includes storage for program codes 232 for implementing the regulatory content language model 102, and codes 234 for implementing functions associated with the task specific processing block 108.

The I/O 208 provides an interface for receiving input via a keyboard 212, pointing device 214. The I/O 208 also includes an interface for generating output on a display 216 and further includes an interface 218 for connecting the processor circuit 200 to a wide area network 220, such as the internet.

The data storage memory 206 may be implemented in RAM memory, flash memory, a hard drive, a solid state drive, or a combination thereof. Alternatively, or additionally the data storage memory 206 may be implemented at least in part as storage accessible via the interface 218 and wide area network 220. In the embodiment shown, the data storage memory 206 provides storage 250 for regulatory content data 104, storage 252 for the regulatory content language model configuration data, storage 254 for the task specific neural network configuration data, and storage 256 for storing results generated by the regulatory content processing block 108.

The inference processor circuit 200 is operable to implement the system 100 for processing regulatory content shown in FIG. 1 when configured with the applicable training and configuration data in storage locations 252-254 of the data storage memory 206.

Figure 3:
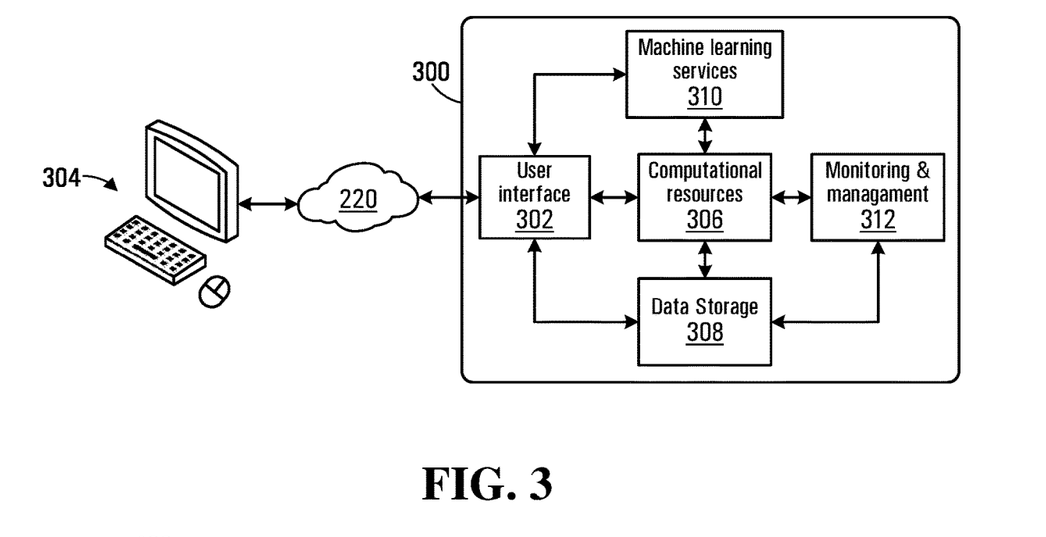
FIG. 3 is a block diagram of a training system for training the system shown in FIG. 1.

Processes for generating the necessary neural network training and configuration data stored in the locations 252 and 254 are described in more detail below. The training may be performed on a conventional processor circuit such as the inference processor circuit 200. However, in practice neural network configuration and training is more commonly performed on a specifically configured training system such as a machine learning computing platform or cloud-based computing system, which may include one or more graphics processing units. An example of a training system is shown in FIG. 3 at 300. The training system 300 includes a user interface 302 that may be accessed via an operator's terminal 304. The operator's terminal 304 may be a processor circuit such as shown at 200 in FIG. 3 that has a connection to the wide area network 220. The operator is able to access computational resources 306 and data storage resources 308 made available in the training system 300 via the user interface 302. In some embodiments, providers of cloud based neural network training systems 300 may make machine learning services 310 that provide a library of functions that may be implemented on the computational resources 306 for performing machine learning functions such as training. For example, a neural network programming environment TensorFlow™ is made available by Google Inc. TensorFlow provides a library of functions and neural network configurations that can be used to configure the above described neural network. The training system 300 also implements monitoring and management functions that monitor and manage performance of the computational resources 306 and the data storage 308. In other embodiments, the functions provided by the training system 300 may be implemented on a stand-alone computing platform configured to provide adequate computing resources for performing the training.

Generally, the training of the neural networks for implementing the regulatory content language model 102 and the task specific processing block 108 are performed under supervision of an operator using the training system 300. In other embodiments the training process may be unsupervised or only partly supervised by an operator. The operator will typically determine an appropriate neural network configuration for generating a desired task specific output. The operator then prepares a training data set, which is used in a training exercise to establish weights and biases for the neural network portions of the regulatory content language model 102 and task specific processing block 108. In some embodiments the set of training data samples may have associated labels or annotations that indicate a ground truth output result for each sample. In other embodiments, set of training data may include unannotated training data samples. In some embodiments the training data set may include a combination of annotated and unannotated training data samples. During the training exercise, the operator may make changes to the configuration of the neural network until a satisfactory accuracy and performance is achieved. The resulting neural network configuration and determined weights and biases may then be saved to the applicable locations 252-254 of the data storage memory 206 of the inference processor circuit 200. As such, the regulatory content language model 102 and task specific processing block 108 may be initially implemented, configured, and trained on the training system 300, before being configured for regular use on the inference processor circuit 200.

Figure 4:
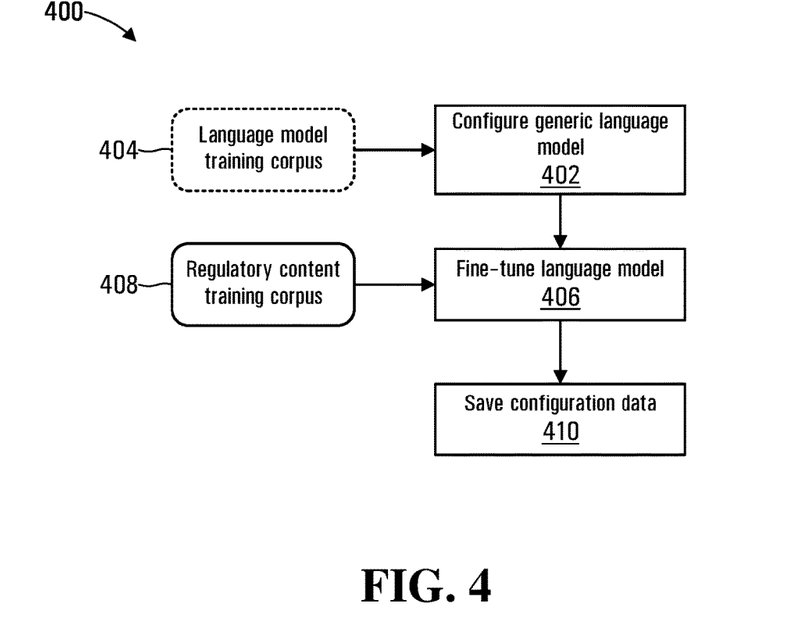
FIG. 4 is a process flowchart of a process for training a regulatory content language model of the system shown in FIG. 1.

Referring to FIG. 4, a process for training the regulatory content language model 102 using the training system 300 is shown as a process flowchart at 400. As shown at block 402, the process begins by configuring a generic language model on the training system 300. In one embodiment the generic language model may be implemented using a pre-trained language model, such as Google's BERT (Bidirectional Encoder Representations from Transformers) or OpenAI's GPT-3 (Generative Pretrained Transformer). Configuration of the generic language model in block 402 may involve accessing and configuring library functions within a neural network programing environment such as TensorFlow to implement a desired generic language model. These language models are implemented using neural networks and may be pre-trained using a large multilingual training corpus 404 (i.e. sets of documents including sentences in context) to capture the semantic and syntactic meaning of words in text. The generic language model training corpus 404 is shown in broken outline in FIG. 4, since in many cases a generic language model may be implemented in a form that has already been trained on an extensive training corpus. The generic language model may thus be invoked in an already trained configuration, which is capable of outputting the meaning of each word or portion of a word in context as the language embedding output 106. The language embedding output 106 may be in the form of a language embedding vector, which includes a plurality of values that capture the contextual meaning of the word. Words of similar meaning will thus be represented by vectors that have similar, but not necessarily identical values.

In some embodiments the regulatory content 104 may be separated into tokens before processing each token in context to generate the language embedding output 106. A token is a sequence of characters grouped together as a useful semantic unit for processing. For example, the word "sleeping" may be represented by a first token "sleep" and a second token "ing". Tokenization may be implemented at a word level, sub-word level, and/or character level. In the remainder of this description, the term token will be used to refer to sequences of one or more characters that have been rendered from the original regulatory content. Tokenization is usually undertaken on the basis of a vocabulary file that provides a set of words that will be used for the tokenization of content. As an example, a tokenizer vocabulary file may not include the word "sleeping" but may include sub-words "sleep" and "ing", in which case the tokens will be output as "sleep" and "##ing". Words that cannot be split into sub-words are known as out-of-vocabulary (OOV) words and may be tokenized on a character-by-character basis, or otherwise handled. Regulatory content language models generally process content in context, which may further involve splitting groups of tokens or text into text sequences, which may be sentence based.

Examples of the types of documents making up the generic language model training corpus 404 include documents from Wikipedia, scientific publications, books, etc. By including documents in different languages in the training corpus, the language model may be trained to generate multilingual language embeddings. Generating a multilingual language model facilitates ease of use and maintenance of the system, since a single model would be capable of processing regulatory content in many different languages. However, in some embodiments, separate language models can be implemented and trained for each language. This requires that there be sufficient labeled regulatory content training data for the intended language. The training corpus 404 used for training many language models comprises unlabeled text data, and the training process is essentially self-supervised by the language model. Since the training corpus comprises words and sentences in context, techniques such as word masking and next sentence prediction may be employed by the generic language model to make the training process semi-supervised without going to the laborious process of labeling the corpus. Generic language models may thus be trained for both word-level and sentence-level tasks, which are both applicable for the task specific processing performed by the task specific processing block 108. As an example, requirement extraction and the identification of requirement descriptions within regulatory content are generally sentence-level tasks. In contrast, detection of citations and smart fields are generally token-level tasks. Generic language models such as BERT, ALBERT, RoBERTa, and DistilBERT, which employ deep bidirectional transformer architectures, perform well in both sentence-level and token-level tasks.

The generic language model is generally trained for processing generic language content that typically would be encountered in everyday situations. However, word distributions in regulatory text may differ from the generic text. As shown at block 406, the process 400 for training the generic language model further includes a fine-tuning step, in which the generic language model of block 402 is refined using a regulatory content training corpus 408 to improve its performance in generating relevant word embedding outputs for regulatory content. In the training embodiment 400, this difference is accounted for by performing a fine-tuning of the generic language model to generate the regulatory content language model 102. Fine-tuning generally proceeds as described above for generic training, except that a learning rate is reduced so that the effect of the pre-training of the generic language model 102 is not significantly changed. As such, fine-tuning involves small adjustments to the parameters of the pre-trained language model to generate a regulatory content language model 102 that is optimized for performance regulatory content, without significantly altering the performance of the language model on generic content. In the embodiment shown in FIG. 4, the fine-tuning is performed using a regulatory content training corpus 408, which include a relatively large number of regulatory content documents. As noted above, regulatory content may fall into any of a number of classes, such as regulations, permits, plans, bylaws, standards, etc. In some embodiments the regulatory content training corpus 408 may be limited to one of these categories and the fine-tuning performed at block 406 may be based on a corpus of different documents in the same category. In other embodiments the regulatory content training corpus 408 may include documents in different categories to produce a broader based regulatory content language model 102. The regulatory content training corpus 408 may also include multi-lingual documents, such that the regulatory content language model 102 is trained to generate embedding outputs for regulatory content is different languages.

In this embodiment the regulatory content training corpus 408 comprises unlabeled or unannotated regulatory content text data, which has the advantage of avoiding the burden of preparing a labeled training corpus. The fine-tuning performed at block 406 proceeds on the same basis as the self-supervised pre-training of the generic language model at block 402, including masking of words and/or next sentence prediction etc. The fine-tuning process has the advantage of refining the language model to improve performance on text data from the regulatory content domain. In a BERT implementation using the huggingface Transformers library, the training input would be regulatory content having some words replaced by a special token [MASK]. The training input is first fed through a tokenizer, which separates the training content into tokens. The tokenized training input is then provided to a Bert Model configured with a language modeling output layer. The same training content in which the masked words still appear is also tokenized and provided as a labeling input to the model for the purposes of training.

Following completion of the fine-tuning at block 406, configuration data of the fine-tuned language model is output and saved in the regulatory content language model 102 configuration data storage locations 252, in the data storage memory 206 of the inference processor circuit 200 shown in FIG. 2. The fine-tuned regulatory content language model 102 is thus capable of providing regulatory content relevant token embedding outputs 106 that may be used in a variety of regulatory content processing tasks.

Referring back to FIG. 1, the task specific processing block 108 of the system 100 receives the language embedding output 106 from the regulatory content language model 102 and generates task specific results. In some embodiments the task specific processing block 108 may be configured as a feature extraction network that is separately trained to output the task specific results 110 based on the language embedding output 106 of the regulatory content language model 102. The task specific processing block 108 may be trained using training data in which regulatory content inputs have an associated label indicating a ground truth task result assigned by an operator. In this case, the regulatory content language model 102 has its parameters frozen, and the task specific processing block 108 is separately trained to generate the task specific results 110.

Figure 5:
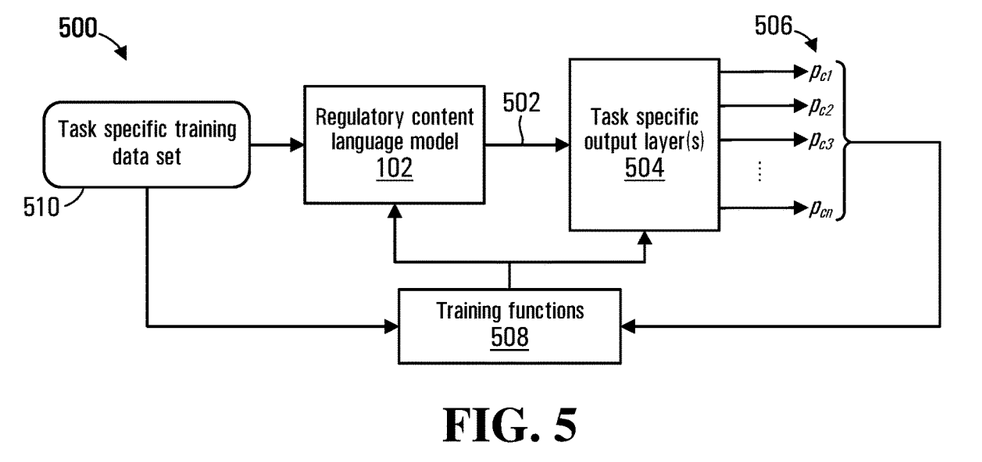
FIG. 5 is a block diagram of a configuration for training a regulatory content processing system.

In other embodiments, the regulatory content language model 102 may be trained in conjunction with the task specific processing block 108 to generate the task specific results 110. As at least some parameters of the regulatory content language model 102 would remain unfrozen and be subject to change. A block diagram of this alternative training configuration that may be implemented on the training system 300 is shown in FIG. 5 generally at 500. In this embodiment, the language model 102 is configured and fine-tuned generally as described above in connection with FIG. 4. The regulatory content language model 102 is thus trained to generate a language embedding output 502 for a regulatory content input received by language model. The training configuration 500 further includes one or more task specific neural network layers 504, which are configured to receive the language embedding output 502 and generate a task specific result 506. In the embodiment shown the task specific result 506 is a classification output having n possible categories, c1-cn. In this embodiment the task specific neural network layers 504 are configured to output probabilities $p_{c1}$, $p_{c2}$, and $p_{c3}$, each indicating a likelihood that the input to the regulatory content language model 102 falls within the respective categories c1-cn. As an example, in one embodiment a final output layer in the output layers 504 may be configured as a softmax layer, which causes the probabilities $p_{c1}$, $p_{c2}$, $p_{c3}$ and $p_{cn}$ to add up to 1.00.

The training configuration 500 also includes a training block 508, which implements functions on the training system 300 for training the one or more task specific neural network layers 504 and adapting the regulatory content language model 102 to generate the task specific result 506. During training, a task specific training data set 510 is fed into the regulatory content language model 102. The training block 508 includes functions for evaluating the task specific result 506 via a loss function. The training block 508 also includes functions for back-propagating errors in the result to modify parameters of the regulatory content language model 102 and task specific neural network layers 504. An optimization function is generally used for modifying the weights and biases of each neuron in the neural network. The regulatory content language model 102 generally has a final layer that outputs the values of the language embedding vector for each word or token. The task specific neural network layers 504 are configured depending on the task to be performed. In some embodiments, the task specific neural network layers 504 may include a linear layer that is fully connected to receive the language embedding vector from the regulatory content language model 102. This linear layer may be followed by a classification layer, such as a softmax layer, that generates the task specific result 506.

In this embodiment the parameters of the regulatory content language model 102 are not frozen, which allows the parameters of the language model to be refined using the optimization function for producing the task specific result 506. The optimization function generally includes a learning rate that controls a magnitude of the change to each of the weights and biases of the neurons during each training iteration. During task specific training the learning rate is usually set at a low level that limits the change magnitude such that the effect of the pre-training and fine-tuning (block 406 FIG. 4) of the regulatory content language model 102 is not lost. In the embodiment shown in FIG. 5, the task specific training thus includes further adaptation of the regulatory content language model 102 to better generate the task specific result 506. The process of adaptation of the regulatory content language model 102 is in effect a second fine-tuning of the regulatory content language model 102, based this time on task specific training data.

As disclosed above, the regulatory content language model 102 may be trained as a multilingual language model in which regulatory content in many different languages can be processed to generate the language embedding output 502. Many current language model implementations do not even require identification of the language of the input, which reduces system complexity and prevents prediction errors due to language identification. The language model may thus intentionally not be informed of the language of the regulatory content so that pre-trained embeddings cannot be explicitly language specific. The multilingual nature of the language embedding output 502 may be further reinforced by providing a multilingual regulatory content training corpus 408 for adaptation the language model 102, as disclosed above in connection with FIG. 4.

It is desirable that the multilingual regulatory content processing capability be preserved when the training system configuration 500 is further trained for generating the task specific results 506. However, providing a labeled task specific training data set 510 that includes labeled regulatory content for each language may be prohibitively expensive. In this embodiment the training data set 510 includes labeled training samples for at least one language. The training data set 510 may thus include labeled training samples for only a single language, or in some cases a few selected languages. The reduced labeling requirement significantly reduces the time and effort needed to prepare the training set. For example, the training data set 510 may include labeled training sample in the English language, which are used to train the task specific neural network layers 504 for generation of the task specific result 506. Following the training, the training configuration 500 employs zero-shot transfer learning to produce the task specific result 506 for other unseen languages based on the training on English regulatory content. Task specific training regulatory content may have many more representative articles in one language (for example, in English) than other languages. Sampling may be used to balance the number of articles based on language frequency. Tokenization is usually performed on the basis of a vocabulary list, which may be based on the frequency of occurrence of the token in each regulatory content language.

In some embodiments, the task specific training data set 510 may further include unlabeled samples from other languages in addition to the labeled samples from the selected training language or languages. The inclusion of regulatory content in other languages may improve the effectiveness of the transfer learning to a level that approaches the performance of language specific trained systems. The pre-trained language model 102 has already learnt an alignment between the vocabulary of each language and naturally integrates language alignment between languages. The zero-shot transfer training of the one or more task specific neural network layers 504 thus extends the functionality for generating the task specific result 506 for monolingual regulatory content. In many cases performance for other languages approaches the performance of language-specific models trained using labeled language-specific regulatory content data.

In this embodiment, the regulatory content language model 102 will have a set of previously established parameters based on its generic pre-training and subsequent fine-tuning (block 406, FIG. 4), as described above. These previously established parameters will thus be modified during the task specific training using the training configuration 500 based on the task specific training data set 510. For the task specific training, the learning rate implemented by the optimization function is generally set to a low value, such that the previously established parameters are only perturbed by a small amount and such that the trained functionality of the regulatory content language model 102 is not compromised. In some training embodiments the learning rate for the task specific neural network layers 504 may be set at a higher rate than the learning rate for adaptation of the regulatory content language model 102. Alternatively, or additionally, layer specific learning rates may be implemented or some layers of the regulatory content language model 102 may be frozen (essentially a zero learning rate). As an example, in the regulatory content language model 102, the pre-training may be considered adequate for all layers preceding the final hidden layers, and these preceding layers may be frozen during training.

The training configuration 500 shown in FIG. 5 may be implemented to configure the training system 300 or other processor to perform any one of a number of tasks, as described in more detail following.

Citation Detection and Representation

Figure 6A:
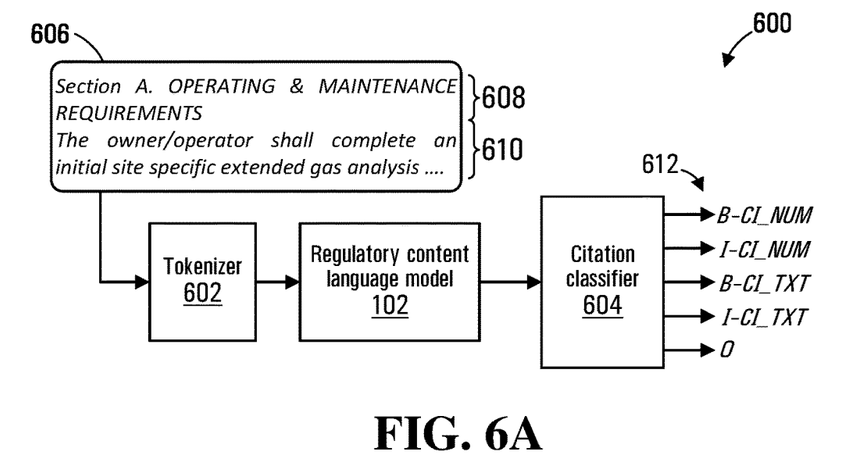
FIG. 6A is a block diagram of a citation identification system embodiment, which may be implemented on the inference processor circuit of FIG. 2.

In one embodiment the training configuration 500 may be used to train a system for performing the task of citation detection within regulatory content. In context of regulatory content, a citation is a reference to one or more requirements or conditions within the text of the regulatory content. Regulatory content often includes explicit alphanumeric citations, either in the form of numeric or other characters that indicate a sequence or in the form of alphabetical text characters. Referring to FIG. 6A, a citation identification system for identifying citations with regulatory content is shown generally at 600. The citation identification system 600 includes a tokenizer 602, the regulatory content language model 102, and a citation classifier 604. The citation identification system 600 is trained to perform named entity recognition (NER) on each sentence in the document. In one embodiment, the citation classifier block 604 may include a linear layer configured for performing token classification based on the language embedding generated by the regulatory content language model 102. An example of a portion of a regulatory content input is shown at 606. The regulatory content input portion 606 includes a heading 608, which includes citation numbers and a portion of a sentence 610, which does not include citations. The citation classifier 604 is configured to generate a citation classification output 612.

The tokenizer 602 separates the regulatory content input 606 into tokens (i.e. words and sub-words). The regulatory content language model 102 generates a language embedding output for each token as described above. The citation classifier 604 then receives the language embedding output and generates the citation classification output 612. In this embodiment the citation classification output 612 includes probabilities associated with five target classes. Citations in regulatory content may include text that implies a sequence (herein referred to as "citation numbers") and/or text that acts as a heading or title for a requirement (herein referred to as "citation titles"). The location of citation number and citation title within a phrase may also be significant. In this embodiment, the citation classification output 612 includes the classes listed in the table below.

| Class | Description | FIG. 6A example |
| --- | --- | --- |
| B-CI_NUM | Citation identifier number at the beginning of a phrase | "Section" |
| I-CI_NUM | Continuation of a citation identifier number within a phrase | "A." |
| B-CI_TXT | Citation identifier title at the beginning of a phrase | "OPERATING" |
| I-CI_TXT | Continuation of citation identifier title inside a phrase | "&", "MAINTENANCE", "REQUIREMENTS" |
| O | Regulatory content body text not including citation identifiers | "The", "owner", etc. |

In the above example, the "A." includes sub-words "A", and ".". Similarly, "REQUIREMENTS" includes sub-words "REQUIRE" and "##MENTS". Prediction of the citation classification 612 is performed on a token basis. Post processing based on heuristics may be implemented to confirm or correct assigned labels. For example, if a word between two words labeled as I-CI_TXT is initially assigned an "O" label (body text), then the word label is changed to I-CI_TXT for consistency.

The citation identification system 600 may be trained on a training data set 510 as described above in connection with FIG. 5. For training the citation identification system 600, the training data set 510 includes sentences in which each token has been assigned a class corresponding to the classes of the citation classification output 612. As disclosed above, in one embodiment the training data set 510 may include labeled samples for only one language, or at most for a few languages. Labeling regulatory content in other languages is labor intensive. However, if there is sufficient labeled regulatory content for one language, the trained citation identification system 600 can be effectively used to identify citations for other unlabeled languages. Following the training exercise, the parameters of the regulatory content language model 102 and the citation classifier 604 may be stored in the storage locations 252 and 254 of the data storage memory 206 of the inference processor circuit 200 (FIG. 2). The inference processor circuit 200 will thus be configured to process regulatory content stored in the data storage location 250 of the data storage memory 206 and to generate task specific regulatory content processing results, which may be stored in the storage location 256 of the data storage memory 206 and/or displayed on the display 216.

The citation identification system 600 thus outputs a classification for each token in the regulatory content input 606. The citation classification output 612 may be further processed to generate a hierarchy of citations, which is useful in evaluating the requirements associated with the citations. In one embodiment a hierarchical tree of citation nodes is constructed by considering parent/child relationships between different citations. By establishing hierarchical levels for citation nodes in the tree, a determination can be made as to whether two consecutive citation nodes have a sibling relationship (i.e. the same level within the tree and the same format) or have a parent-child relationship (i.e. a different level within the tree and a different format). A hierarchical relationship classifier is described in detail in commonly owned U.S. patent application Ser. No. 17/017, 406, entitled METHOD AND SYSTEM FOR IDENTIFYING CITATIONS WITHIN REGULATORY CONTENT, filed on Sep. 10, 2020, and incorporated herein by reference in its entirety.

Figure 6B:
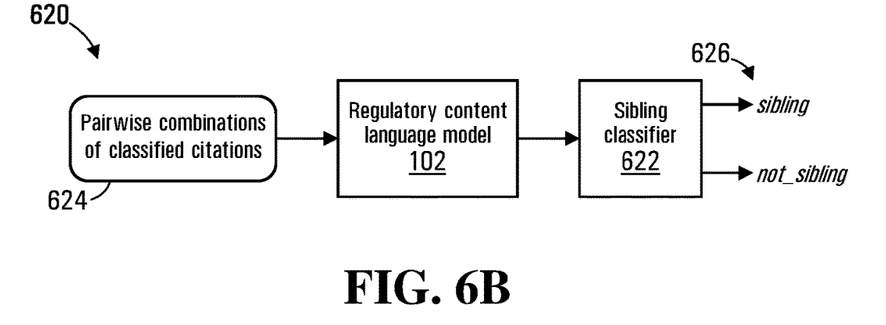
FIG. 6B is a block diagram of a relationship classifier system used in conjunction with the citation identification system shown in FIG. 6A embodiment, which may be implemented on the inference processor circuit of FIG. 2.

Referring to FIG. 6B, in one embodiment the training configuration 500 may be used to train a relationship classifier system 620. The relationship classifier system 620 includes the pre-trained and fine-tuned regulatory content language model 102 and a sibling classifier 622. The sibling classifier 622 includes one or more neural network layers configured to generate a classification output 626 indicating a probability that the input pair of citations have a parent/child relationship (i.e. "sibling" or "not sibling"). The regulatory content language model 102 receives an input 624 including pairwise combinations of citations.

The relationship classifier system 620 may be trained using a plurality of pairs of citations that are labeled as either "sibling" or "not sibling", which provides the labeled task specific training data set 510 shown in the training configuration 500 of FIG. 5. As disclosed above, in one embodiment the training data set 510 may include labeled citation samples for only one language, or at most for a few languages. The labeled pairs of citations may be used to further adapt (or fine-tune) the regulatory content language model 102 and to train the sibling classifier 622 to generate the classification output 626. The relationship classifier system 620 thus generates a classification for each citation identified by the citation identification system 600 of FIG. 6A. This classification is then used to construct the hierarchical tree by placing citations that are classified as being "sibling" at a level above citations that are classified as being "not-sibling". In other embodiments the sibling classifier 622 may be configured as a parent classifier, which is configured to generate a classification of citations as being "parent citations" or "not-parent citations".

Requirement Extraction

Figure 7:
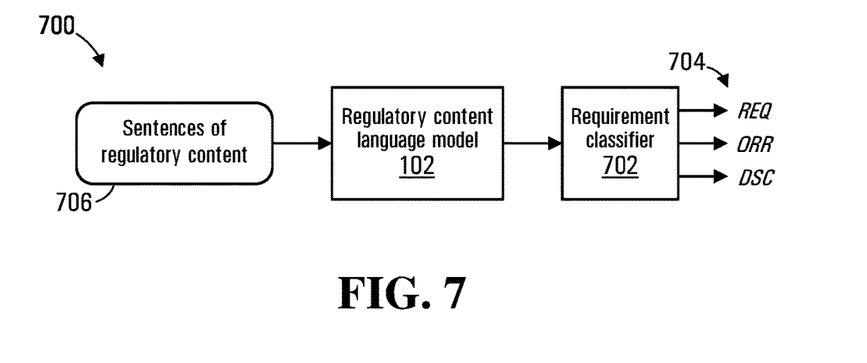
FIG. 7 is a block diagram of a requirement extraction system embodiment, which may be implemented on the inference processor circuit of FIG. 2.

It is useful to be able to exact requirements from regulatory content and to further identify which of the requirements are mandatory and which are optional. In regulatory content, not all of the text includes requirements, since some of the text may be explanatory, definitional, contextual, or address the obligations of the issuing regulatory body. Referring to FIG. 7, a requirement extraction system for identifying requirements in regulatory content is shown generally at 700. The requirement extraction system 700 includes the pre-trained and fine-tuned regulatory content language model 102 that receives sentences of regulatory content 706 as an input.

The input in this embodiment thus differs in some respects from the tokenized input in FIG. 6A, since this input includes sequences of tokens corresponding to sentences or text sequences. In a Google BERT implementation of the regulatory content language model 102, a special token [CLS] is used to denote the start of each sequence and a special [SEP] token is used to indicate separation between sentences or text sequences. In the BERT Language model, a maximum number of 512 tokens can be input and processed simultaneously. For text classification tasks in BERT, a final hidden state h of the first special token [CLS] is generally taken as the overall representation of the input sequence. As such for a BERT implementation of the regulatory content language model 102 in the requirement extraction system 700, the language embedding output 502 of the regulatory content language model 102 would be a vector W of 768 parameter values associated with the final hidden layer h for each token in the input sequence.

The requirement extraction system 700 further includes a requirement classifier 702, which is configured to generate a classification output 704 based on the output of the language model 102. Regulatory content generally includes a plurality of requirements, some of which may be optional or site specific requirements. The classification output 704 of the requirement classifier 702 has three probability classes, REQ, ORR, and DSC. The REQ output represents a probability that the sentence includes a requirement, which is taken to mean the requirement is not optional or site specific. The ORR output represents a probability that the sentence incudes a requirement that is either optional or a recommendation. In regulatory content, some actions may be conducted by the regulated entity as an option or alternative to another requirement or some recommended actions may be desirable but not mandatory. Finally, the DSC output represents a probability that the sentence includes descriptive language related to a requirement but is not itself a requirement.

For training of the requirement extraction system 700 using the training configuration 500, a set of sentences that are labeled as REQ, ORR, or DSC are input as the labeled task specific training data set 510. As described above, the labeled sentences may be confined to a single language. The parameters of the regulatory content language model 102 are then adapted based on evaluating a loss function for the classification output 704, and back-propagating errors to the weights W of the layer h and other layers of the regulatory content language model 102. In one embodiment the requirement classifier 702 is configured as a softmax classifier, which receives the regulatory content language model 102 output and generates classification output probabilities 704 that add up to 1.00. Following training, the configuration and parameters of the regulatory content language model 102 and the requirement classifier 702 may be stored in the storage locations 252 and 254 of the data storage memory 206 of the inference processor circuit 200 (FIG. 2). The inference processor circuit 200 will thus be configured to process regulatory content stored in the data storage location 250 of the data storage memory 206 to identify requirements.

Requirement Description

In regulatory content, a requirement extracted by the requirement extraction system 700 may be followed by one or more subsidiary extracted requirements. Extracted requirements may thus have a "parent-child" relationship and in some cases, several child requirements may stem from a common parent requirement. Similarly, a child requirement may itself have one or more child requirements, for which the child requirement then acts as a parent. Identifying these parent/child relationships between extracted requirements is useful, since the wording of the parent requirement and each of the child requirements may be combined to form a complete requirement description. The complete requirement description would necessarily include the text of the parent requirement together with the text of the child requirement. The complete requirement description is thus a concatenation of parent and child requirement texts.

Figure 8:
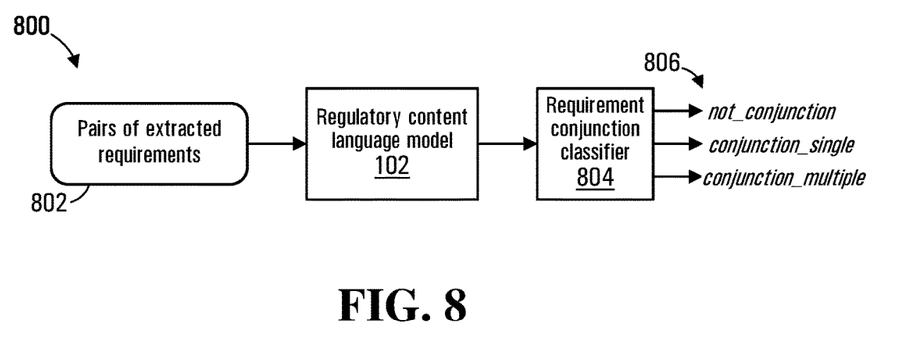
FIG. 8 is a block diagram of a conjunction classifier system embodiment, which may be implemented on the inference processor circuit of FIG. 2.

Referring to FIG. 8, a requirement conjunction classifier system is shown generally at 800. The system 800 includes the regulatory content language model 102, which in this embodiment receives pairs of extracted requirements 802 as an input. Each pair of extracted requirements 802 are identified as being separated, for example by using the [SEP] token for a BERT implementation of the regulatory content language model 102.

The system 800 further includes a requirement conjunction classifier 804, which is configured to generate a classification output 806 based on the output of the language model 102. The requirement conjunction classifier 804 may be implemented by adapting aspects of textual entailment processing, which are performed to identify whether a sentence and a hypothesis represent an entailment, a contradiction, or are neutral. In this embodiment, the requirement conjunction classifier 804 generates a classification output having three probability classes. The first probability class, not_conjunction represents a probability that the pair of extracted requirements 802 do not share a parent-child relationship. The second probability class, conjunction_single represents a probability that the pair of extracted requirements 802 have a parent-child relationship, with the child requirement having a single requirement. The third probability class, conjunction_multiple represents a probability that the pair of extracted requirements 802 have a parent-child relationship, with the child requirement having multiple separate requirements.

The requirement conjunction classifier system 800 may be trained by generating a labeled task specific training data set 510 including a plurality of pairs of separated requirements, each pair having an assigned label indicating that the pair falls into one of the not_conjunction, conjunction_single, or conjunction_multiple classes. The system 800 may then be trained as described above in connection with FIG. 5 using the task specific data set. The classification output 806 may be further post-processed to generate the final requirement description.

Smart Fields

In regulatory content text fields within the regulatory content may have a common connotation between different documents that can be identified as smart fields. An example of smart fields within extracted requirements are various "requirement types", which may be assigned to smart field subcategories such as equipment standard, testing and procedure, inspection, notification, record keeping, reporting, and operation standard. Another example would be "frequency", related to a timing frequency at which an action must be repeated, such as annual, semi-annual, event-driven, ongoing, or specific date. Other smart fields such as an "equipment type" or "equipment identifier" may also be identified.

Figure 9:
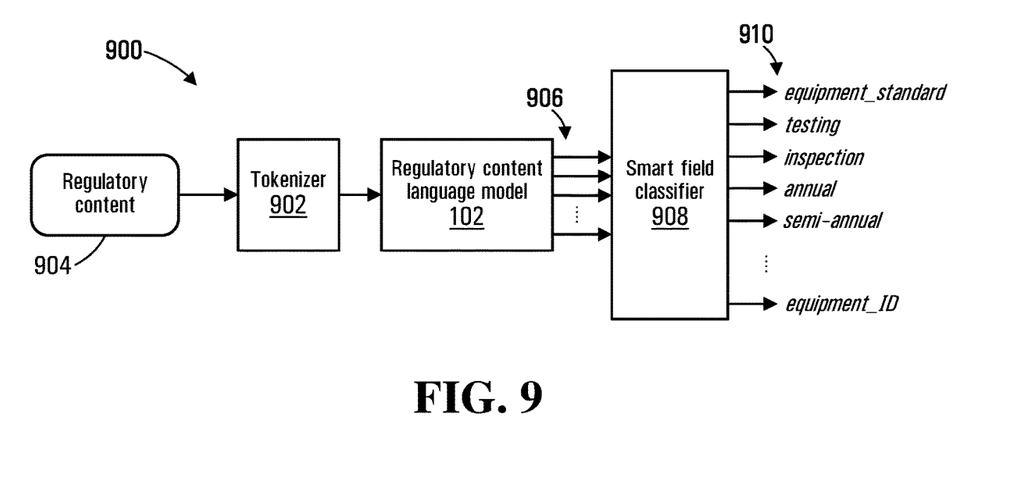
FIG. 9 is a block diagram of a smart field identification system, which may be implemented on the inference processor circuit of FIG. 2.

Referring to FIG. 9, a smart field identification system is shown generally at 900. The smart field identification system 900 includes the regulatory content language model 102 and a tokenizer 902. The tokenizer 902 receives an input of regulatory content 904 and separates the content into tokens, which are passed through the regulatory content language model 102 to generate a language embedding output. In this embodiment the smart-fields are thus generated for separated tokens. In this embodiment, the regulatory content language model 102 outputs a language embedding vector 906 for each token received from the tokenizer 902. Each language embedding output 906 of the regulatory content language model 102 is then fed through one or more neural network layers 908 that are configured to act as a smart field classifier The language embedding outputs 906 for each token may thus be fed through the same fully connected layers to generate a classification output 908, which includes a plurality of classes corresponding to smart fields that are to be identified. In the example shown in FIG. 9, the smart field classifications include regulatory content specific smart field classifications, such as equipment specific smart fields (equipment_standard, testing, inspection), time specific smart fields (annual, semi-annual), and other smart fields.

The smart field identification system 900 may be trained on a training data set 510 as described above in connection with FIG. 5. The training data set 510 may include already tokenized words that have been assigned an associated smart field classification. The labeled training data may be directly input into the regulatory content language model 102, which is adapted to generate the classification output 908 based on the training data. As disclosed above, in one embodiment the training data set 510 may include labeled samples for only one language, or at most for a few languages.

The embodiments of the inference systems shown in FIG. 6-9 are each implemented using the same general training approach shown in FIG. 5 or FIG. 1. Once configuration parameters have been determined during training, the parameters may be loaded into the data storage memory 206 of the inference processor circuit 200 for use in processing actual regulatory content. In each of these embodiments the pre-trained and fine-tuned regulatory content language model 102 is used to generate the language embeddings. For implementation of each of the described tasks the regulatory content language model 102 is further adapted to generate the task specific result. Alternatively, the output of the regulatory content language model 102 may be frozen and the task-specific neural network may be trained for generating the result. The embodiments shown have the advantage of being specifically tailored to operate on regulatory content rather than generic language and further trained to generate the specific result. However, utilizing the pre-trained and fine-tuned regulatory content language model facilitates multi-lingual operation without requiring separate training for each language. This has the advantage of reducing the preparation time for labeled regulatory content training data.

While specific embodiments have been described and illustrated, such embodiments should be considered illustrative only and not as limiting the disclosed embodiments as construed in accordance with the accompanying claims.

What is claimed is:

1. A method for training a computer implemented neural network system for performing a processing task on regulatory content, the method comprising:
   configuring a neural network language model capable of generating a language embedding output in response to receiving content;
   fine-tuning the language model using regulatory content training data to generate a regulatory content language embedding output for regulatory content processed by the language model;
   configuring at least one task specific output layer to generate task specific results in response to receiving the regulatory content language embedding output from the language model; and
   training the neural network system using task specific training data to output the task specific results, at least a portion of the task specific training data having been labeled prior to configuring the task specific neural network.

2. The method of claim 1 wherein configuring the language model comprises configuring a pre-trained neural network language model for generation of the language embedding output, the pre-trained neural network language model including a plurality of layers of neurons, each neuron having an associated weight and bias, the weights and biases having been determined during training of the language model.

3. The method of claim 2 wherein fine-tuning the language model comprises one of:

modifying weights and biases of the neurons of the language model based on the regulatory content training data;

freezing weights and biases of at least some of the layers of neurons while modifying weights and biases of other layers of neurons based on the regulatory content training data; or adding at least one additional layer of neurons to the language model and determining weights and biases of the at least one additional layer based on the regulatory content training data.

4. The method of claim 1 wherein the regulatory content training data comprises a plurality of documents including regulatory text.

5. The method of claim 4 wherein the regulatory text in the plurality of documents comprises unlabeled regulatory text.

6. The method of claim 4 wherein the plurality of documents include regulatory text in a plurality of different languages.

7. The method of claim 4 wherein the plurality of documents including regulatory text are pre-processed to generate the regulatory content training data by masking at least some words within sentences of the regulatory text and wherein fine-tuning comprises configuring the neural network language model to generate a prediction for the masked words based on context provided by un-masked words in the sentence and updating the neural network language model based on a comparison between the generated prediction and the masked word.

8. The method of claim 4 wherein the regulatory content training data comprises pairs of sentences extracted from regulatory text associated with the plurality of documents and wherein fine-tuning comprises configuring the neural network language model to generate a prediction as to whether the second sentence in the sentence pair follows the first sentence in the document and updating the neural network language model based on whether the generated prediction is correct.

9. The method of claim 1 wherein the regulatory content language embedding output comprises a plurality of vectors, each vector including a plurality of values representing a context for each word in the regulatory content.

10. The method of claim 1 wherein configuring the at least one task specific output layer comprises configuring a classification layer operable to generate a classification output for the regulatory content.

11. The method of claim 10 wherein training the neural network system to generate the classification output comprises a further fine-tuning of the language model based on the task specific training data.

12. The method of claim 10 wherein the classification output is associated with one of:
an identification of a plurality of text fields within the regulatory content that have a common connotation between different documents;
an identification of requirements or conditions within the regulatory content; or
an identification of citations within the regulatory content, each citation being associated with one or more requirements or conditions within the regulatory content.

13. The method of claim 1 wherein configuring the at least one task specific output layer comprises configuring a classification output layer to generate:
a classification identifying text as a citation sequence;
a classification identifying text as a citation title; and
a classification identifying text as not being associated with a citation; and
wherein the neural network system is trained using training data including labeled samples corresponding to a citation sequence, labeled samples corresponding to a citation title, and labeled samples not associated with a citation.

14. The method of claim 13 wherein configuring the at least one task specific output layer comprises configuring a classifier output layer to generate:
a classification identifying citations as being one of a sibling citation or not a sibling citation;
wherein the neural network system is trained using training data including pairs of samples including samples labeled as having a sibling relationship and samples labeled as not having a sibling relationship.

15. The method of claim 13 wherein configuring the at least one task specific output layer comprises configuring a classifier output layer to generate:
a classification identifying citations as being one of a parent citation or not a parent citation;
wherein the neural network system is trained using training data including pairs of samples including samples labeled as having a parent relationship and samples labeled as not having a parent relationship.

16. The method of claim 1 wherein configuring the at least one task specific output layer comprises configuring a requirement classification output layer to generate:
a classification identifying text as corresponding to a requirement;
a classification identifying text as corresponding to an optional or site-specific requirement; and
a classification identifying text as including descriptive language related to a requirement but is not itself a requirement; and
wherein the neural network system is trained using training data including text sequences that are labeled as requirements, samples labeled as optional or site-specific requirements, and samples labeled as descriptive text.

17. The method of claim 1 wherein configuring the at least one task specific output layer comprises configuring a requirement conjunction classifier output layer to generate:
a classification identifying a requirement as not being a conjunction;
a classification identifying a requirement as being a conjunction between a parent requirement and a single child requirement; and
a classification identifying a requirement as being a conjunction between a parent requirement and multiple child requirements; and;
wherein the neural network system is trained using training data including a plurality of pairs not a conjunction, a single child requirement conjunction, or a multiple child requirement conjunction.

18. The method of claim 1 wherein configuring the at least one task specific output layer comprises configuring a smart field classifier output layer to generate a plurality of classifications identifying text fields within the regulatory content having a common connotation and wherein the neural network system is trained using training data including labeled samples corresponding to each of the plurality of classifications.

19. The method of claim 1 wherein the task specific training data for training the task specific neural network comprises a portion of unlabeled training data.

20. The method of claim 19 wherein the portion of labeled task specific training data comprises regulatory text associated with a first language and wherein the portion of unlabeled training data comprises regulatory text associated with a language other than the first language.

21. A system for performing a processing task on regulatory content, the system comprising:
   a processor circuit;
   codes for directing the processor circuit to implement a regulatory content language model capable of generating a language embedding output in response to receiving regulatory content, the regulatory content language model having been fine-tuned using regulatory content training data to generate a regulatory content language embedding output for regulatory content;
   codes for directing the processor circuit to implement at least one task specific output layer to generate task specific results in response to receiving the regulatory content language embedding output from the language model, the neural network system having been trained using task specific training data to output the task specific results, at least a portion of the task specific training data having been labeled prior to configuring the task specific neural network.

* * * * *

UNITED STATES PATENT AND TRADEMARK OFFICE
CERTIFICATE OF CORRECTION

PATENT NO. : 11,232,358 B1  
APPLICATION NO. : 17/486555  
DATED : January 25, 2022  
INVENTOR(S) : Mahdi Ramezani et al.

Page 1 of 1

It is certified that error appears in the above-identified patent and that said Letters Patent is hereby corrected as shown below:

In the Claims

In Claim 17 at Column 18, Lines 53 to 56, replace "wherein the neural network system is trained using training data including a plurality of pairs not a conjunction, a single child requirement conjunction, or a multiple child requirement conjunction" with -- wherein the neural network system is trained using training data including a plurality of pairs of separated requirements, each pair having an assigned label indicating whether the pair is not a conjunction, a single child requirement conjunction, or a multiple child requirement conjunction --.

Signed and Sealed this
Twenty-sixth Day of July, 2022

Katherine Kelly Vidal
*Director of the United States Patent and Trademark Office*